United States Patent
Oh et al.

(10) Patent No.: US 11,787,410 B1
(45) Date of Patent: Oct. 17, 2023

(54) TORQUE DISTRIBUTION METHOD FOR VEHICLE

(71) Applicants: Hyundai Motor Company, Seoul (KR); Kia Corporation, Seoul (KR)

(72) Inventors: Ji Won Oh, Hwaseong-Si (KR); Young Joon Chang, Yongin-Si (KR); Jeong Soo Eo, Hwaseong-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 18/096,790

(22) Filed: Jan. 13, 2023

(30) Foreign Application Priority Data

Sep. 2, 2022 (KR) .................. 10-2022-0111141

(51) Int. Cl.
| | |
|---|---|
| *B60W 30/188* | (2012.01) |
| *B60W 30/182* | (2020.01) |
| *B60W 40/13* | (2012.01) |
| *B60W 10/08* | (2006.01) |
| *B60W 50/00* | (2006.01) |

(52) U.S. Cl.
CPC ........ *B60W 30/188* (2013.01); *B60W 30/182* (2013.01); *B60W 10/08* (2013.01); *B60W 40/13* (2013.01); *B60W 2040/1392* (2013.01); *B60W 2050/0019* (2013.01); *B60W 2050/0052* (2013.01); *B60W 2510/22* (2013.01); *B60W 2520/10* (2013.01); *B60W 2520/16* (2013.01); *B60W 2530/10* (2013.01); *B60W 2540/10* (2013.01); *B60W 2540/12* (2013.01); *B60W 2710/083* (2013.01)

(58) Field of Classification Search
CPC ............. B60W 30/188; B60W 30/182; B60W 2510/22; B60W 2520/16; B60W 2530/10; B60W 2540/10; B60W 2540/12; B60W 2520/10; B60W 40/13; B60W 2040/1392; B60W 2040/1307; B60W 10/04; B60W 10/06; B60W 10/08; B60W 10/119; B60W 10/18; B60W 10/184; B60W 20/10; B60W 30/18118; B60W 30/18172; B60W 2710/083; B60W 2710/18; B60W 2050/0019; B60W 2050/0052; B60W 2050/0054; B60W 2050/0055; B60W 2050/0056
USPC .......................................... 701/69
See application file for complete search history.

(56) References Cited

U.S. PATENT DOCUMENTS

| | | | | |
|---|---|---|---|---|
| 8,510,007 | B2 * | 8/2013 | Mori ................ | B60L 58/12 180/65.265 |
| 2008/0249690 | A1 * | 10/2008 | Matsumoto .......... | F16F 15/02 180/69.6 |
| 2015/0153748 | A1 * | 6/2015 | Saito ................. | B60W 10/08 701/37 |

FOREIGN PATENT DOCUMENTS

| | | | |
|---|---|---|---|
| JP | 2021120254 A | * | 8/2021 |
| JP | 2022184648 A | * | 12/2022 |

* cited by examiner

*Primary Examiner* — Roger L Pang
(74) *Attorney, Agent, or Firm* — MORGAN, LEWIS & BOCKIUS LLP

(57) ABSTRACT

In a torque distribution method for a vehicle, torque is optimally distributed to front and rear wheels of a vehicle by reflecting pitch motion characteristics and longitudinal load movement information of the vehicle in real time. The repetition of wheel slip and the degradation of wheel slip control performance caused by the pitch motion are reduced. The longitudinal load movement of the vehicle is reduced.

20 Claims, 6 Drawing Sheets

TORQUE DISTRIBUTION METHOD FOR VEHICLE

CROSS-REFERENCE TO RELATED APPLICATION

The present application claims priority to Korean Patent Application No. 10-2022-0111141 filed on Sep. 2, 2022, the entire contents of which is incorporated herein for all purposes by this reference.

BACKGROUND OF THE PRESENT DISCLOSURE

Field of the Present Disclosure

The present disclosure relates to a torque distribution method for a vehicle, and more particularly, to a method able to optimally distribute torque to front and rear wheels of a vehicle by reflecting pitch motion characteristics and longitudinal load movement information of the vehicle in real time.

Description of Related Art

Recently, while a variety of electronic control devices have been introduced to a vehicle, the motion of the vehicle is ultimately limited by road friction. This is because the motion of the vehicle is obtained through friction with the road surface. Thus, the ability of the vehicle to use friction effectively is a major factor in determining the motion of the vehicle.

To effectively use friction, it is important to control friction that the road surface may provide so that the friction is not exceeded by either the driving force or the braking force of the wheels. Here, the friction that the road surface may provide is influenced in a complex manner by characteristics of the road surface, amounts of longitudinal and lateral tire slip, tire vertical load, and the like. From among these factors, tire vertical load may be viewed as a most direct influencing factor of road friction.

Typically, it is known that an electronic control device, such as an anti-lock braking system (ABS) and a traction control system (TCS), is used as a method of using friction to limit tire slip. However, neither of the ABS and TCS control methods may have effective slip control performance due to problems, such as wheel speed signal processing for preventing control period delay or malfunction.

Recently, according to the trend of wheel slip control strategies in electrified vehicles, a number of methods of using the torque and speed of a motor based on rapid motion of the motor instead of using a reference speed of a vehicle body and a wheel speed have been provided.

Such strategies advantageously do not need an absolute speed or a reference speed, and thus may be effective in an electric four-wheel drive (e-4WD) system. However, when a control operation of reflecting information regarding suspension pitch motion and tire vertical load changing by the suspension pitch motion in advance is not performed, a situation in which driving force reduction control is required due to limitations in feedback control may occur repeatedly.

For example, when front wheel driving force is generated, a pitch angle of a vehicle may be increased. Subsequently, the vertical load of the front wheels may be reduced, causing tire slip in the front wheels. At the instant time, when the TCS is operated to reduce the front wheel driving force, amounts of tire slip may be reduced and the pitch angle of the vehicle may be reduced, so that the vertical load of the front wheels may be obtained again. However, when the front wheel driving force is increased subsequently, the pitch angle of the vehicle may be increased again and the vertical load of the front wheels may be reduced, so that tire slip may occur again in the front wheels.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a torque distribution method for a vehicle, the method configured to optimally distribute torque to front and rear wheels of a vehicle by reflecting pitch motion characteristics and longitudinal load movement information of the vehicle in real time, reducing the repetition of wheel slip and the degradation of wheel slip control performance caused by the pitch motion and the longitudinal load movement of the vehicle.

The objects of the present disclosure are not limited to the aforementioned object, and the other objects not mentioned may be clearly understood by those with ordinary skill in the art to which the present disclosure pertains (hereinafter "those skilled in the art") from the following description.

In one aspect, the present disclosure provides a torque distribution method for a vehicle. The torque distribution method may include: determining a natural frequency of a vehicle suspension pitch motion according to characteristics of a suspension of the vehicle; providing a filter or a transfer function model for extracting or enhancing a natural frequency component of the vehicle suspension pitch motion to a controller of the vehicle; determining, by the controller, a distribution ratio correction value as an output from the filter or the transfer function model through processing of the filter or the transfer function model including total torque as an input, the total torque being applied to a drive system from a drive device; correcting, by the controller, at least one torque distribution ratio of a front wheel torque distribution ratio and a rear wheel torque distribution ratio based on the determined distribution ratio correction value; and distributing, by the controller, a target torque command as a front wheel torque command and a rear wheel torque command based on the corrected torque distribution ratio while driving of the vehicle.

As described above, in the torque distribution method for a vehicle according to an exemplary embodiment of the present disclosure, the torque distribution method for a vehicle may optimally distribute torque to front and rear wheels of a vehicle by reflecting pitch motion characteristics and longitudinal load movement information of the vehicle in real time, reducing the repetition of wheel slip and the degradation of wheel slip control performance caused by the pitch motion and the longitudinal load movement of the vehicle.

An effect of the present disclosure is not limited to the aforementioned effect, and the other effects not mentioned may be clearly recognized by those skilled in the art from the following description.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
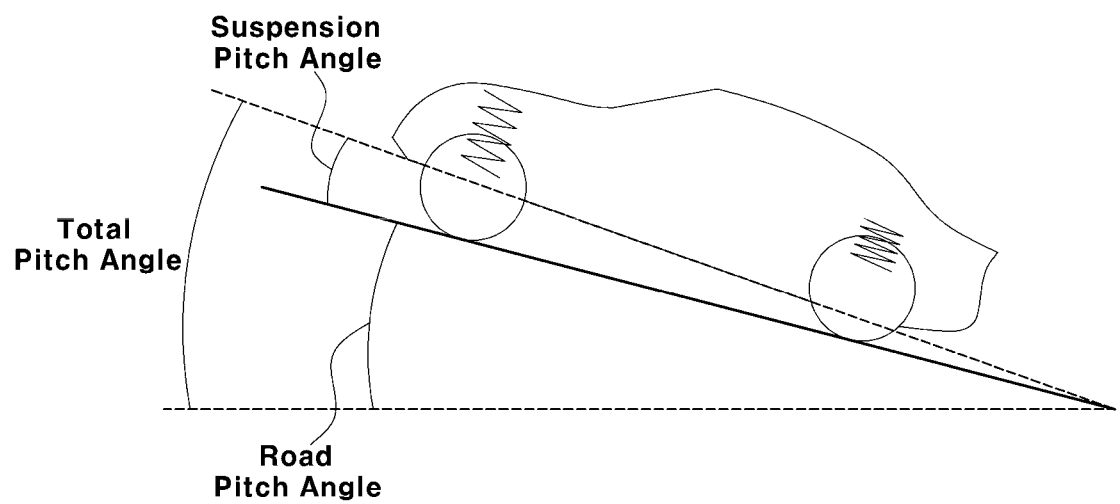
FIG. 1 is a diagram illustrating a pitch angle in a vehicle.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Meanwhile, in the present disclosure, terms such as first and/or second may be used to describe various components, but the components are not limited to the terms. The terms are used only for distinguishing one component from other components. For example, a first component may be referred to as a second component, and similarly, the second component may also be referred to as the first component, without departing from the scope according to the concept of the present disclosure.

When a component is referred to as being "connected" or "coupled" to another component, it should be understood that the components may be directly connected or coupled to each other, but still other component may also exist therebetween. On the other hand, when a component is referred to as being "directly connected to" or "in direct contact with" another component, it should be understood that there is no other component therebetween. Other expressions for describing the relationship between components, that is, expressions such as "between" and "directly between" or "adjacent to" and "directly adjacent to" should be also interpreted in the same manner.

The present disclosure relates to a torque distribution method for a vehicle, and is directed to providing a method able to control torque distribution to front and rear wheels of the vehicle by reflecting pitch motion characteristics and longitudinal load movement information of the vehicle in real time in advance, reducing the repetition of wheel slip and the degradation of wheel slip control performance caused by the pitch motion and the longitudinal load movement of the vehicle.

The present disclosure is useful for environmentally friendly vehicles using a motor as a vehicle driving source, i.e., a drive device configured for driving a vehicle. That is, the present disclosure may be useful for motor driven vehicles, such as battery electric vehicles (BEVs), hybrid electric vehicles (HEVs), and fuel cell electric vehicles (FCEVs).

In the present disclosure, torque is referred to as including both drive torque and brake torque. In the present disclosure, force caused by torque may be a sum of forces acting between tires of drive wheels connected to the drive device in a power transmittable manner and the road surface.

In the following description, the force will be referred to as driving force output by the drive device and applied to the drive wheels by way of example. The driving force is force caused by drive torque output by the drive device configured for propelling a vehicle, and acts in a direction in which the vehicle is accelerated.

Here, the drive device may be a motor when the vehicle is a battery electric vehicle or a fuel cell electric vehicle or a motor and an engine when the vehicle is a hybrid electric vehicle. When the drive device of the vehicle is a motor, torque applied to the drive wheels is torque applied by the motor.

Furthermore, the present disclosure may be applied to a 4WD vehicle provided with a front wheel drive device and a rear wheel drive device to independently apply controlled torque to the front wheels and to the rear wheels. For example, the present disclosure may be applied to an e-4WD vehicle provided with a front wheel driving motor and a rear wheel driving motor.

When torque applied to the front wheels and the rear wheels is controlled using individual driving motors in a vehicle provided with an e-4WD system, the distribution of torque to the front wheels and to the rear wheels is performed so that a sum of torque distributed to the front wheels and torque distributed to the rear wheels meets desired torque necessary in driving of the vehicle. The distribution and application of torque to the front wheels and the rear wheels is performed by controlling the operation of the front wheel driving motor and the rear wheel driving motor applying torque to the corresponding wheels (i.e., drive wheels).

For reference, in the present disclosure, the distribution and control of torque may be performed by controlling the operation and output power of the front wheel drive device and the rear wheel drive device or controlling torque applied to the drive wheels. In the following description, terms "driving force" and "driving force command" may be replaced with "drive torque" and "drive torque command," respectively.

Furthermore, in the present disclosure, the term "torque" has a meaning including both drive torque and brake torque as described above. In the following description, in deceleration or braking of a vehicle, the terms "driving force" and "driving force command" may be replaced with "brake torque" and "brake torque command," respectively.

In the instant case, a method of distributing brake force or brake torque for decelerating the vehicle rather than driving force or drive torque for accelerating the vehicle will be apparent to those skilled in the art from the following description. In the same manner, the terms "braking force" and "braking force command" may be replaced with "brake torque" and "brake torque command," respectively.

In the present disclosure, when torque is brake torque, the drive device may be replaced with a brake device in the following description. When the drive device of the vehicle is a motor, the brake device includes a motor (i.e., a regenerative brake device) and a friction brake device applying regenerative braking force and frictional braking force to corresponding wheels (i.e., drive wheels).

The fundamental concept of the front and rear wheel torque distribution according to present disclosure is to use state and characteristics information of the pitch motion of a vehicle. Conventional torque control methods for reducing wheel slip are mainly feedback types for correcting torque after wheel slip has already occurred.

In contrast, the present disclosure adjusts the magnitude of torque (i.e., driving force) to respond to the pitch motion in real time by use of the state and characteristics information of the pitch motion of a vehicle, e.g., information regarding changes in vertical load, before the occurrence of wheel slip.

The state and characteristics information of the pitch motion of a vehicle may be tire vertical load and a pitch angle of the vehicle, of which the tire vertical load is one of most direct factors for determining the limit of the traction between the road surface and the tire.

With increases in the tire vertical load, available traction increases, making wheel slip less likely to occur. With decreases in the tire vertical load, available traction also decreases, making wheel slip more likely to occur.

There are a variety of reasons that tire vertical load changes, and it is difficult to control torque by considering disturbance from among such reasons. Thus, excluding changes caused by disturbance, changes in tire vertical load caused by torque itself, at least, are considerable in the process of torque control.

Furthermore, when driving force is caused by torque generated by the drive device in a vehicle, pitch moment may occur due to the difference between the center of gravity and the center of pitch of the vehicle, and thus the pitch motion of the vehicle may be excited. Here, a pitch angle is formed due to mechanical characteristics of a suspension and a vehicle body.

In general, when a vehicle accelerates, the pitch angle thereof increases. The state of the vehicle at the instant time is referred to as a nose-up motion or a squatting position. Furthermore, when a vehicle decelerates, the pitch angle thereof decreases. This is referred to as a nose-down motion or a diving position.

Such a pitch motion occurring in a vehicle compresses and expands the suspension of the vehicle. Consequently, a spring or a damper of the suspension is displaced, affecting tire vertical load.

In the present disclosure, only a suspension pitch angle rather than a road pitch angle is considered in the pitch motion. The definition of the suspension pitch angle is as shown in FIG. 1. FIG. 1 is a diagram illustrating the pitch angle in a vehicle.

As illustrated in FIG. 1, the pitch angle in the vehicle may be divided into a suspension pitch angle and a road pitch angle. A sum of the suspension pitch angle (absolute value) and the road pitch angle (absolute value) may be defined as a total pitch angle.

In an occurrence of a difference in stroke between a front wheel suspension and a rear wheel suspension, the front wheel suspension is more rebounded (i.e., expanded) than the rear wheel suspension and the rear wheel suspension is more bumped (i.e., compressed) than the front wheel suspension. The suspension pitch angle at the instant time may be defined as a positive (+) suspension pitch angle.

Here, the suspension pitch angle of the state of the vehicle illustrated in FIG. 1 has a positive (+) value. However, the present disclosure is not limited thereto, and the positive (+) and negative (−) of the suspension pitch angle may be defined opposite to the example of FIG. 1.

The road pitch angle corresponds to a longitudinal inclination of the vehicle caused by the inclination of the road surface. The suspension pitch angle indicates a longitudinal inclination of the vehicle (in a pitch direction) occurring due to expanding or compression of the rear wheel suspension. In a typical vehicle, the road pitch angle (i.e., road gradient) may be detected using a longitudinal acceleration sensor.

Information regarding the suspension pitch angle (i.e., suspension pitch angle information) in the vehicle as illustrated in FIG. 1 indicates the vibration state of the vehicle in the pitch direction according to changes in the stroke of the front wheel suspension and the rear wheel suspension while driving of the vehicle. The suspension pitch angle information may be obtained using a sensor of the suspension or may be estimated based on information collected using a sensor in the vehicle.

A method of obtaining the suspension pitch angle information using the sensor of the suspension in the vehicle is a well-known technology. For example, the suspension pitch angle information of the vehicle may be determined by comparing the positions of the front and rear wheels based on signals from a position sensor of the front wheel suspension and a position sensor of the rear wheel suspension.

Furthermore, a method of estimating the suspension pitch angle information is also a well-known technology. That is, a method of obtaining a pitch angle by integrating a signal from a pitch rate sensor and a kinematic estimation method based on a value from a longitudinal or vertical acceleration sensor are known.

Furthermore, a method of estimating the pitch angle using a suspension model based observation device, a method of determining the pitch angle using a wheel speed information and driving force information model, a combined method of observing the pitch angle information by integrating the former methods, and the like are known.

The state of the vehicle illustrated in FIG. 1 may be referred to as indicating a positive (+) direction thereof. In the present position, the vehicle may be referred to as being in a squatting position with respect to the suspension pitch angle. When the suspension pitch angle indicates a negative (−) direction opposite to the illustration of FIG. 1, the vehicle may be referred to as being in a diving position with respect to the suspension pitch angle.

Furthermore, the state of the vehicle illustrated in FIG. 1 may also be referred to as being in the squatting position with respect to the vehicle body, since the rear portion of the vehicle body is inclined backward thereof. The squatting position with respect to the vehicle body (i.e., vehicle body squatting position) may refer to the vehicle body inclined backward with respect to a horizontal line (angle of inclination=0°).

Furthermore, a position in which the vehicle body is inclined forward may be referred to as the diving position with respect to the vehicle body. The vehicle body diving position may refer to a position in which the vehicle body is inclined forward with respect to the horizontal line. As described above, in acceleration of the vehicle, the squatting position may be induced with respect to the suspension pitch angle. In deceleration of the vehicle, the vehicle diving position may be induced with respect to the suspension pitch angle.

Here, changes in the vehicle suspension pitch motion or the longitudinal load movement of the vehicle in response to changes in the state of the suspension occur according to characteristics (i.e., suspension characteristics of the vehicle) determined by the unique settings of the suspension of the vehicle. Here, the settings include all of spring strength, damping force, bushing strength, suspension arm geometry, and the like of the suspension.

Due to these characteristics, suspension pitch motion, such as diving (i.e., nose-down motion) or squatting (i.e., nose-up motion), of the vehicle occurs while including characteristics determined by the settings. Such characteristics mean motion including a specific natural frequency.

Thus, in the present disclosure, the vehicle suspension pitch motion or the longitudinal load movement, determined by the settings and characteristics of the suspension of the vehicle, is modeled, a frequency component corresponding to the natural frequency of the present model is extracted from the torque command using a filter, and then front and rear wheel torque in which the suspension pitch motion or the longitudinal load movement is previously considered is determined using the extracted frequency component.

Furthermore, consequently, wheel slip may be prevented by reducing the torque distribution ratio of a drive wheel likely to slip (or lose traction) due to the longitudinal load movement, between the front and rear wheels. At the same time, additional acceleration performance of the vehicle is obtained within the range in which wheel slip may be inhibited by increasing the torque distribution ratio of a drive wheel, traction of which is obtained due to longitudinal load movement, between the front and rear wheels.

Figure 2:
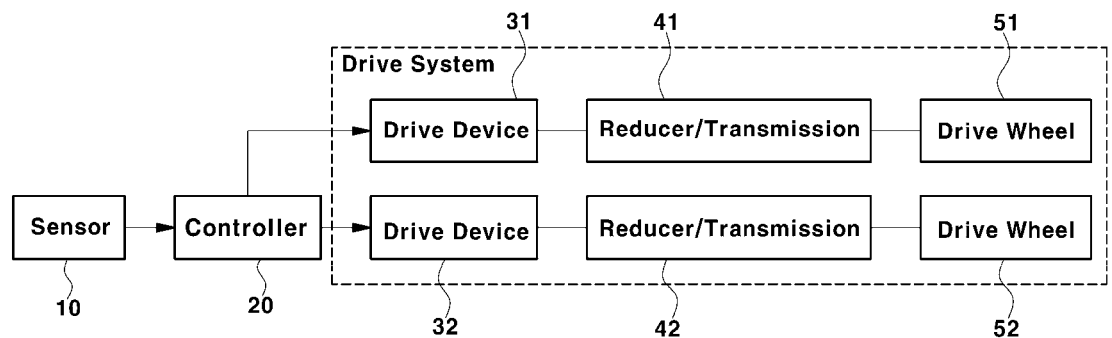
FIG. 2 is a block diagram illustrating a configuration of a torque distribution apparatus according to an exemplary embodiment of the present disclosure.
Figure 3:
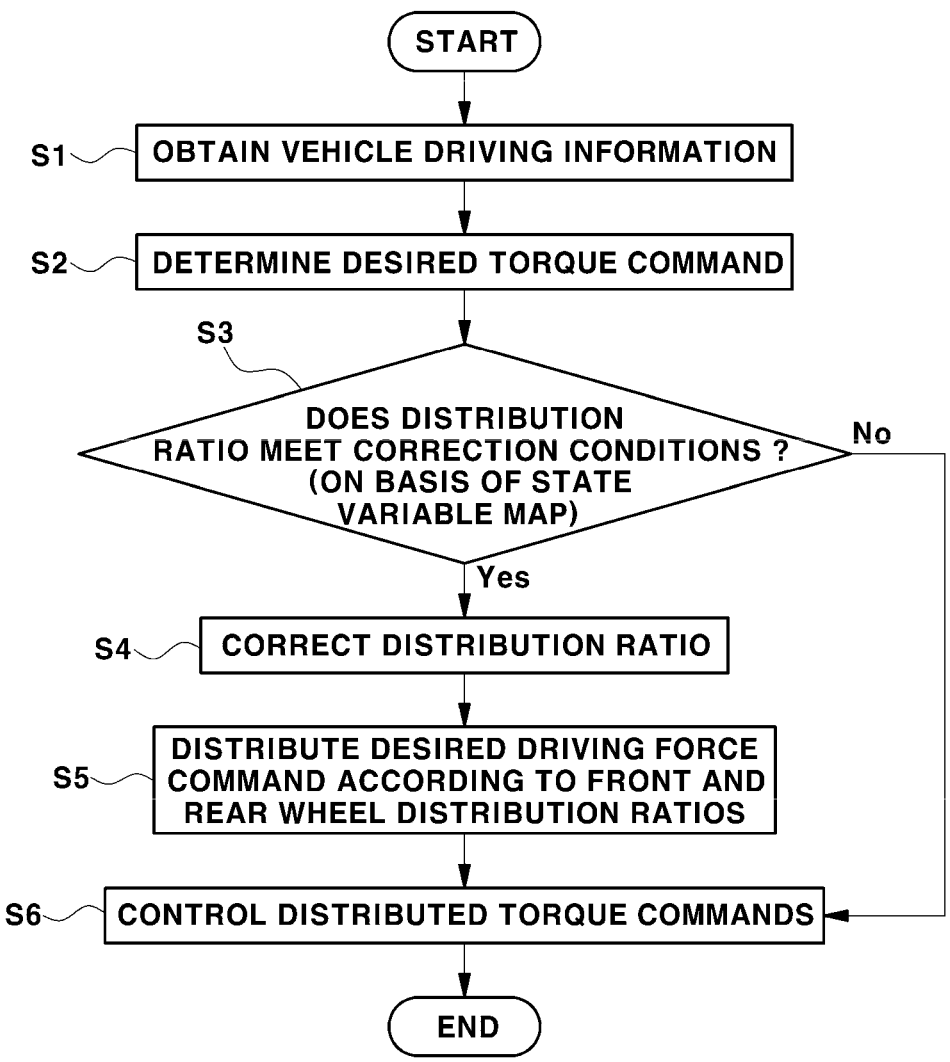
FIG. 3 is a flowchart illustrating a torque distribution process for a vehicle according to an exemplary embodiment of the present disclosure.

Hereinafter, a torque distribution method according to an exemplary embodiment of the present disclosure will be described in detail together with an apparatus of distributing torque to front and rear wheels. FIG. 2 is a block diagram illustrating a configuration of the apparatus of distributing torque to front and rear wheels according to an exemplary embodiment of the present disclosure, and FIG. 3 is a flowchart illustrating a torque distribution process for a vehicle according to an exemplary embodiment of the present disclosure.

First, as illustrated in FIG. 2, the apparatus of distributing torque to front and rear wheels according to an exemplary embodiment of the present disclosure includes a controller 20 determining torque commands from vehicle driving information and controlling torque applied to drive wheels 51 and 52 using the determined torque commands and drive devices 31 and 32 configured to generate torque (i.e., driving force) for driving a vehicle, in which the operation (i.e., the output of torque) of the drive devices 31 and 32 is controlled by torque commands generated by the controller 20.

The drive devices 31 and 32 are connected to the drive wheels 51 and 52 in a power transmittable manner. Here, the drive wheels 51 and 52 are connected to the drive devices 31 and 32 through a reducer or a transmission 41 and 42 in a power transmittable manner. Driving forces generated and output by the drive devices 31 and 32 are transmitted and applied to the drive wheels 51 and 52 through the reducer or the transmission 41 and 42.

Furthermore, in a vehicle to which the present disclosure is applied, the drive wheels 51 and 52 include the front wheels 51 and the rear wheels 52. The drive devices 31 and 32 provided as driving sources to drive the vehicle includes the front wheel drive device (or front driving source) 31 and the rear wheel drive device (or rear driving source) 32. The front wheel drive device 31 is connected to the front wheels 51 of the vehicle in a power transmittable manner, and the rear wheel drive device 32 is connected to the rear wheels 52 of the vehicle in a power transmittable manner.

In a vehicle to which the present disclosure is applied, the front wheel drive device 31 may be an engine or a motor, and the rear wheel drive device 32 may be an engine or a motor. For example, the front wheel drive device 31 may be an engine and the rear wheel drive device 32 may be a motor. Alternatively, both the front wheel drive device 31 and the rear wheel drive device 32 may be motors.

Furthermore, in an electrified vehicle provided with motors as the drive devices 31 and 32, inverters for driving and controlling the motors according to torque commands output by the controller 20 are provided. In a state in which the motors and inverters are provided in the vehicle, a battery of the vehicle is connected to the motors through the inverters in a chargeable and dischargeable manner.

The controller 20 obtains variable information indicating a vehicle driving state collected in real time, i.e., real-time vehicle driving information, while driving of the vehicle (step S1 in FIG. 3) and determines a target torque command based on the obtained real-time vehicle driving information (step S2 in FIG. 3). A method of determining and generating a target torque command by the controller and a process thereof are well known in the art, and thus detailed descriptions thereof will be omitted.

In the present disclosure, the controller 20 may be a vehicle control unit (VCU) or a hybrid control unit (HCU) determining and generating a target torque command according to a driver's driving input or a driving mode based on vehicle driving information in a typical electrified vehicle. In the following description, driving force will be taken as an example. The term "driving force command" may be replaced with "drive torque command" or "torque command."

In the present disclosure, a target driving force command corresponds to a total command corresponding to a sum of driving force commands for each drive device, and indicates a total driving force command before distribution of driving force into driving force commands for each drive device.

For example, in a vehicle provided with an engine as the front wheel drive device and a motor as the rear wheel drive device, the target driving force command is a total driving force command before being distributed to the drive devices, i.e., a total driving force command before being distributed as an engine driving force command (or engine drive torque command) and a motor driving force command (or motor drive torque command).

Furthermore, the target driving force command is a total driving force command before being distributed as a front wheel driving force command and a rear wheel driving force command. When the target driving force command is determined, the controller 20 determines and generates the front wheel driving force command (or front wheel torque command) and the rear wheel driving force command (or rear wheel torque command) by distributing the target driving force command according to front and rear wheel distribution ratios (step S5 in FIG. 3). Thus, a sum of the front wheel driving force command and the rear wheel driving force command is the target driving force command (or target torque command), i.e., the total driving force command.

As described above, the front wheel driving force command is a command that the controller 20 distributes and generates according to the distribution ratio from the target driving force command to apply the driving force (or drive torque) to the front wheel of the drive wheels of the vehicle and the front wheel shaft of the front and rear wheel shafts of the vehicle.

Furthermore, the rear wheel driving force command is a command which the controller 20 distributes and generates according to the distribution ratio from the target driving force command to apply the driving force (or drive torque) to the rear wheels and the rear wheel shaft.

The front wheel driving force command and the rear wheel driving force command may be replaced with the torque command. In the instant case, the value of each driving force command is a value corresponding to torque distributed and applied to the corresponding drive wheels 51 and 52 and the corresponding driveshaft by the front wheel drive device 31 and the rear wheel drive device 32.

Furthermore, the front wheel driving force command and the rear wheel driving force command are a drive torque command for the front wheel drive device and a drive torque command for the rear wheel drive device, respectively. When the drive device of the vehicle is a motor, the front wheel drive torque command and the rear wheel drive torque command are motor torque commands, respectively.

In the following description, the term "front wheel driving force command" may be replaced with "front wheel torque command," "front wheel shaft torque command," or "front wheel shaft driving force command." Furthermore, the term "rear wheel driving force command" may be replaced with "rear wheel torque command," "rear wheel shaft torque command," or "rear wheel shaft driving force command."

When the driving force is caused by the drive torque and defined as a meaning distinguished from the braking force, the term "front wheel driving force command" may be replaced with "front wheel drive torque command," and the term "rear wheel driving force command" may be replaced with "rear wheel drive torque command."

The method of distributing driving force to front and rear wheels according to an exemplary embodiment of the present disclosure may be applied to a 4WD vehicle in which front wheels and rear wheels are driven by separate drive devices, respectively, as described above. The method of distributing driving force to front and rear wheels according to an exemplary embodiment of the present disclosure may be applied to a vehicle including an e-4WD system in which both the front wheel drive device and the rear wheel drive device are motors, i.e., an e-4WD vehicle. Alternatively, the method of distributing driving force to front and rear wheels according to an exemplary embodiment of the present disclosure may be applied to a 4WD vehicle in which one of the front wheel drive device and the rear wheel drive device is an engine and the other of the front wheel drive device and the rear wheel drive device is a motor.

In an example of the e-4WD vehicle, the controller 20 determines the target driving force command (or target torque command) for driving of the vehicle from the vehicle driving information, and distributes the target driving force command as the front wheel driving force command (or front wheel torque command) and the rear wheel driving force command (or rear wheel torque command) according to the determined front and rear wheel driving force distribution ratios.

The target driving force command is determined and generated by the controller 20, based on the vehicle driving information collected in real time while driving of the vehicle. The vehicle driving information may be sensor detected information detected by the sensor 10 and input to the controller 20 through a vehicle network.

The sensor 10 for detecting the vehicle driving information may include an accelerator position sensor (APS) for detecting a driver's accelerator pedal input value, a brake pedal sensor (BPS) for detecting a driver's brake pedal input value, a sensor configured for detecting a drive system speed, and a sensor configured for detecting a vehicle speed.

The drive system speed may be a speed of rotation (or a drive device speed) of the drive devices 31 and 32, a speed of rotation (or drive wheel speed) of the drive wheels 51 and 52 connected to the drive devices 31 and 32 in a power transmittable manner, or a speed of rotation (or driveshaft speed) of the driveshaft.

Here, the speed of rotation of the drive devices 31 and 32 may be a speed of rotation (or engine speed) of the engine or a speed of rotation (or motor speed) of the motor. Here, the sensor configured for detecting the drive system speed is the sensor configured for detecting the engine speed or the sensor configured for detecting the motor speed.

This sensor may be a typical engine revolutions per minute (rpm) sensor or a typical resolver for detecting the position of the rotor of the motor. The sensor configured for detecting the drive system speed may be a wheel speed sensor configured for detecting the speed of rotation (or wheel speed) of the drive wheels 51 and 52 or the speed of rotation of the driveshaft.

Furthermore, the sensor configured for detecting a vehicle speed may also be a wheel speed sensor. Obtaining vehicle speed information from a signal from the wheel speed is well known in the art, and a detailed description thereof will be omitted.

The driver's accelerator pedal input value, the drivers brake pedal input value, the speed (or speed of rotation) of the drive devices 31 and 32, the vehicle speed, and the like may be selectively used as the vehicle driving information detected by the sensor 10 and used to determine the target torque command by the controller 20.

In the vehicle driving information, the accelerator pedal input value and the brake pedal input value may be referred to as driver's driving input information, and the speed of the drive devices 31 and 32 and the vehicle speed may be referred to as vehicle state information.

Alternatively, the target torque command may be determined in accordance with the driving mode by the controller 20, or may be input to the controller 20 through the vehicle network from another controller (e.g., an advanced driver assistance system (ADAS) controller) inside the vehicle.

Furthermore, in an exemplary embodiment of the present disclosure, the sensor 10 may further include a sensor of the suspension for obtaining the suspension pitch angle information. Here, the sensor of the suspension for obtaining the suspension pitch angle information may include a position sensor of the front wheel suspension and a position sensor of the rear wheel suspension.

As described above, a method of obtaining the suspension pitch angle information through the sensor of the suspension is a well-known technology. For example, the suspension pitch angle information of the vehicle may be determined by comparing the position of the front wheel and the position of rear wheel based on the signal from the position sensor.

Furthermore, as described above, the suspension pitch angle or the like may be obtained by a predetermined estimation process based on information collected from the vehicle using the sensor or the like. The estimation method is well-known to those skilled in the art, and thus a detailed description thereof will be omitted.

Furthermore, in the present disclosure, the controller is configured to determine a distribution ratio correction value from the target torque command using a filter including the target torque command as an input or a transfer function model performing a similar role, corrects the front and rear wheel distribution ratios according to the determined distribution ratio correction value, and then distributes the target torque command as the front wheel torque command and the rear wheel torque command according to the corrected front and rear wheel distribution ratios.

In the following description, the distribution ratio means the front and rear wheel distribution ratios, and the distribution ratio correction value means the correction value for the front wheel torque distribution ratio and the rear wheel torque distribution ratio. That is, in the present disclosure, the distribution ratio is respectively determined for the front wheels and the rear wheels (or the front wheel shaft and the rear wheel shaft). For example, when the driving force is to be distributed to the front wheel and the rear wheel at a ratio 7:3, the front wheel driving force distribution ratio may be 7/10, and the rear wheel driving force distribution ratio may be 3/10.

Determination of the torque front and rear wheel distribution ratios according to the vehicle driving state while driving of the vehicle is well known in the art. In the present disclosure, the torque distribution ratio is corrected with the correction value determined using the filter, and then the torque is distributed to the front and rear wheels according to the corrected torque distribution ratio.

In the present disclosure, the filter or the transfer function model for determining the distribution ratio correction value may be a filter or a transfer function model including the target torque command as an input, and may extract or enhance a frequency component in a specific band in the target torque command.

The target torque command input to the filter or transfer function model, which determines and outputs the distribution ratio correction value as described above, is a desired torque value determined according to the driver's driving input (e.g., an APS value) or the driving mode as described above. The target torque command is a total torque command before distribution of torque as torque commands for respective drive devices.

Furthermore, in the present disclosure, an input to the filter or the transfer function model for correcting the torque distribution ratio (e.g., driving force distribution ratio) may be total torque applied to the drive system of the vehicle from the drive device of the vehicle. The input may be an estimated value of total torque which may be applied by all drive devices of the vehicle when the current target torque command is used in place of the target torque command.

Alternatively, the input to the filter or the transfer function model may be sum torque obtained by summing drive device-specific detected torque values applied by the drive devices or sum torque obtained by summing drive device-specific estimated torque values.

The sum torque of drive device-specific detected torque values is sum torque obtained by summing device-specific detected torque values detected by sensors for respective drive devices of the vehicle. The sum torque of device-specific estimated torque values is sum torque obtained by summing device-specific estimated torque values estimated for respective drive devices of the vehicle. The sensor may be disposed on the shaft through which the torque of each drive device is output or transmitted.

In the following description, the target driving force command provided as torque applied to the drive system of the vehicle will be referred to as being used as an input to the filter or the transfer function model in the drive device of the vehicle. However, in the following description, the target torque command (e.g., target driving force command) provided as an input to the filter or the transfer function model may be replaced with the estimated value of total torque, the sum of device-specific detected torque values, or the sum of device-specific estimated torque values described above.

In the present disclosure, the filter or the transfer function model may be previously configured and set in the controller 20 to determine the distribution ratio correction value. In the present disclosure, enhancement of a frequency component in a specific band may mean increasing the frequency component in the specific band.

Furthermore, in the present disclosure, the natural frequency of the filter for determining the distribution ratio correction value may be set to a value the same as or approximate to the natural frequency of the vehicle suspension pitch motion. Thus, the filter or the transfer function model may extract or enhance (i.e., increase) the natural frequency component of the suspension pitch motion according to suspension characteristics of the vehicle from the input target driving force command (or target torque command).

Furthermore, the front and rear wheel driving force distribution ratios (or front and rear wheel torque distribution ratio) may be determined and output as a value, in which the natural frequency component of the suspension pitch motion is extracted and enhanced, from the real-time target driving force command by the filter or the transfer function model.

In the following description, a filter configured for extracting or enhancing the natural frequency component of the suspension pitch motion will be used to determine the distribution ratio correction value. However, in the following description, the "filter" may be replaced with the "transfer function model" configured for extracting or enhancing the natural frequency component of the suspension pitch motion.

Furthermore, to extract or enhance a frequency component for exciting the vehicle suspension pitch motion from the target driving force command using the filter as described above, frequency characteristics of the suspension pitch motion of a vehicle to be controlled should first of all be determined. The present process may be performed by constructing a variety of forms of transfer functions.

Furthermore, in the present disclosure, transfer function information including a variable indicating the vehicle driving state as an input thereof and state information of the vehicle suspension pitch motion as an output is used to determine the natural frequency of the filter and the natural frequency component of the suspension pitch motion to be extracted or enhanced by the filter.

Here, the transfer function information may indicate the natural frequency, and the state information of the suspension pitch motion provided as an output of the transfer function may be the suspension pitch angle information or the tire vertical load information. The tire vertical load information may include front wheel vertical load and rear wheel vertical load.

In the present disclosure, the suspension pitch angle (hereinafter, referred to as a "pitch angle") or the tire vertical load (hereinafter, referred to as a "vertical load") may be determined using the transfer function. An example of determining the pitch angle or the vertical load using the transfer function will be referred to as follows.

In the present disclosure, the transfer function is modeled and constructed to determine the state information of the vehicle suspension pitch motion using a variable indicating the vehicle driving state as an input. Here, the state information of the suspension pitch motion may be a pitch angle or a vertical load.

Figure 4:
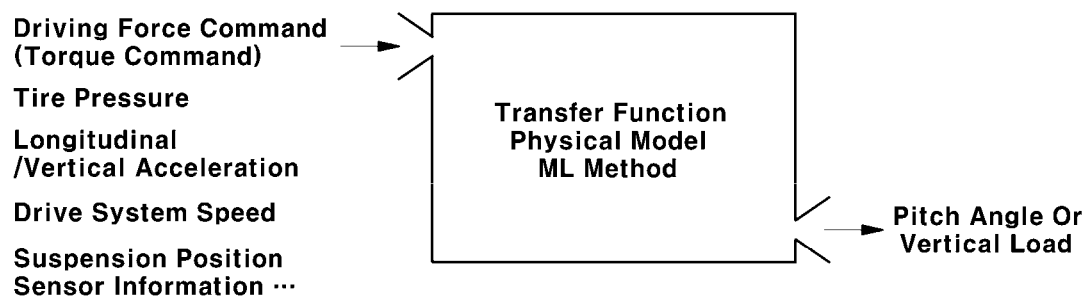
FIG. 4 is a diagram illustrating that a pitch angle or vertical load may be determined using a transfer function according to an exemplary embodiment of the present disclosure.

FIG. 4 is a diagram illustrating that a pitch angle or a vertical load may be determined using a transfer function including a variable indicating a vehicle driving state as an input according to an exemplary embodiment of the present disclosure. In an exemplary embodiment of the present disclosure, the transfer function may have the following format.

As illustrated in FIG. 4, a transfer function including driving force information (driving force command) as an input thereof and pitch angle information as an output or a transfer function including pitch angle information as an input thereof and vertical load information as an output may be constructed in and used by the controller 20. Here, the driving force information may be a target driving force command determined by the controller 20.

The target driving force command provided as an input to the transfer function and the pitch angle are also variable information indicating the vehicle driving state. The target driving force command and the pitch angle may be obtained from information detected by the sensor 10. It has been described previously that the target driving force command is determined from the sensor detected information. It has also been described that the target driving force command may be obtained from information detected by the suspension position sensor of the sensor 10.

Alternatively, a transfer function including driving force information as an input thereof and vertical load information as an output or the transfer function including tire pressure information detected by a tire pressure sensor of the sensor 10 as an input thereof and the vertical load information as an output may be constructed in and used by the controller 20.

Alternatively, a transfer function including the longitudinal or vertical acceleration information of the vehicle detected by the longitudinal acceleration sensor or the vertical acceleration sensor disposed on the vehicle of the sensor 10 as an input thereof and the pitch angle or the vertical load information as an output may be constructed in and used by the controller 20.

Alternatively, a transfer function including pitch angle change rate (or pitch rate) information obtained by a gyrosensor (or pitch rate sensor) as an input thereof and a pitch angle or vertical load information as an output may be constructed in and used by the controller.

Alternatively, a transfer function including drive system speed as an input thereof and a pitch angle or vertical load information as an output may be constructed in and used by the controller. Here, the drive system speed may be wheel speed, drive device speed (or motor speed), or driveshaft speed detected by the sensor 10.

Alternatively, a transfer function including information detected by the suspension position sensor (or suspension travel sensor) as an input thereof and a pitch angle or vertical load information as an output may be constructed in and used by the controller.

Alternatively, a transfer function including two or more pieces of information from the above-described information as an input thereof and a pitch angle or vertical load information as an output may be constructed in and used by the controller.

Here, the transfer function may be configured to determine a pitch angle or vertical load using a data-based optimization method, a numerical solution, or the like.

Alternatively, a transfer function based on a physical model may be constructed and used, a study method may be used to obtain a transfer function. Furthermore, an algorithm including an input and an output as described above may be constructed using a variety of machine learning methods in addition to the transfer function.

Alternatively, in a state in which the transfer function is constructed in the controller, i.e., in a state in which the transfer function configured for outputting the vertical load information or the pitch angle provided as the state information of the suspension pitch motion of a vehicle by use of a variable indicating the vehicle driving state as an input is constructed, the natural frequency of the transfer function may be determined. Here, the transfer function may indicate intrinsic characteristics of the vehicle to which the torque distribution method according to an exemplary embodiment of the present disclosure is applied.

In the present disclosure, in the transfer function constructed to output the state information of the vehicle suspension pitch motion using a variable indicating the vehicle driving state, the natural frequency of the transfer function may be referred to as the natural frequency of vibrations of the suspension pitch motion in the vehicle subject to control. In the following description, the natural frequency of the transfer function and the natural frequency of the vehicle suspension pitch motion may have the same meaning.

Furthermore, as described above, in a state in which the natural frequency of the vehicle suspension pitch motion (i.e., the natural frequency of the previously-constructed transfer function) is determined, a filter including the target torque command (e.g., target driving force command) as an input based on the natural frequency information of the determined transfer function may be constructed in and used by the controller 20. In an exemplary embodiment of the present disclosure, the filter for determining the distribution ratio correction value may be configured for and set as a Laplace transfer function.

In a state in which the transfer function is constructed in the controller 20 of the vehicle to which the present disclosure is actually applied as described above, the suspension pitch motion information (i.e., the state information of the suspension pitch motion) of the vehicle, such as the pitch angle or the vertical load provided as an output of the transfer function, may be used in a variety of manners in control of the vehicle. Furthermore, the natural frequency of the transfer function constructed in the controller of the vehicle may be used in designing and configuring the filter in the controller according to an exemplary embodiment of the present disclosure.

Furthermore, instead of the natural frequency being determined in a state in which the transfer function is actually constructed in the controller 20 of the vehicle according to an exemplary embodiment of the present disclosure as described above, the transfer function as described above may be constructed through a prior evaluation and test process performed in a step of developing the same type of vehicle and then the natural frequency of the transfer function may be obtained. The filter designed using the natural frequency information obtained in the present manner may be configured and set in the controller of an actual mass-production vehicle to be used in correcting the torque distribution ratio (or driving force distribution ratio).

Figure 5:
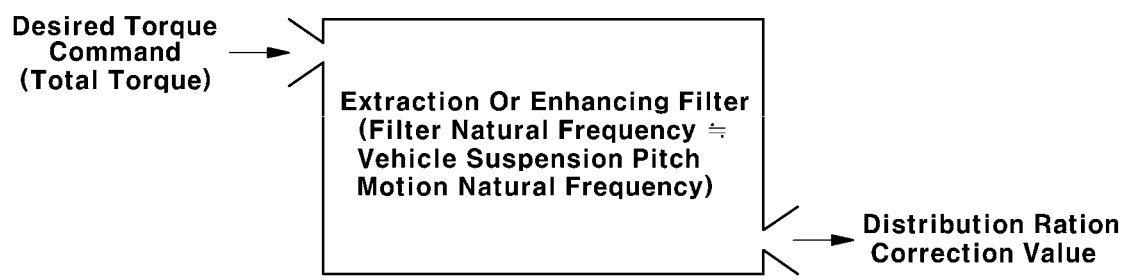
FIG. 5 is a diagram illustrating a natural frequency extraction or enhancement filter including a target driving force command as an input thereof and a distribution ratio correction value as an output according to an exemplary embodiment of the present disclosure.

Hereinafter, the filter for correcting the torque distribution ratio will be described in more detail. FIG. 5 is a diagram illustrating a natural frequency extraction or enhancement filter including a target torque command (or sum torque) as an input thereof and a distribution ratio correction value as an output according to an exemplary embodiment of the present disclosure.

The filter for correcting the torque distribution ratio according to an exemplary embodiment of the present disclosure is a filter allowing a specific frequency component of a previously-constructed transfer function in the target torque command (or sum torque), i.e., a natural frequency component, to pass therethrough. The filter allowing the natural frequency component to pass therethrough means that the filter extracts or enhances (or increases) the natural frequency component when input thereto.

Thus, the filter allowing the natural frequency component to pass therethrough (i.e., a natural frequency pass filter) according to an exemplary embodiment of the present disclosure may be referred to as a filter extracting or enhancing the natural frequency component (i.e., a natural frequency extraction or enhancement filter).

In the present disclosure, the natural frequency component is a frequency component corresponding to the natural frequency of the vehicle suspension pitch motion as described above. A frequency to be extracted through the filter is determined to be the natural frequency of the vehicle suspension pitch motion and used in configuring the natural frequency extraction or enhancement filter.

Here, as described above, the natural frequency of the suspension pitch motion may be the natural frequency of the transfer function including the vertical load or the pitch angle provided as the state information of the suspension pitch motion as an output. The natural frequency of the filter for correction of the distribution ratio is set as a value the same as or approximate to the natural frequency of the vehicle suspension pitch motion.

In the present disclosure, when the vibration of the vehicle suspension pitch motion is analyzed in a frequency range (e.g., analyzed on a Bode plot), a primary frequency at which a peak gain occurs may be defined as the natural frequency.

The driving force command including the frequency component corresponding to the natural frequency excites the vehicle suspension pitch motion, and thus significant longitudinal load movement (i.e., backward movement of the load in the vehicle) occurs, making slip more likely to occur in wheels having reduced traction, in particular, the front wheels, of the vehicle. Thus, determination of the distribution ratio correction value to reduce the wheel slip and the suspension pitch motion of the vehicle may be performed by extracting the natural frequency component from the driving force command.

Accordingly, the transfer function information including the state information of the suspension pitch motion as an output is used. A filter configured for extracting or enhancing the natural frequency component of the transfer function using the natural frequency information of the transfer function indicating the natural frequency of the vehicle suspension pitch motion is configured in the controller 20.

In an exemplary embodiment of the present disclosure, the filter for correction of the distribution ratio may be a low pass filter or a high pass filter including a cut-off frequency corresponding to the natural frequency of the transfer function or a band pass filter including a center frequency corresponding to the natural frequency.

In use of the filter, the cut-off frequency of the low pass filter or the high pass filter or the center frequency of the band pass filter may not accurately match the natural frequency of an object to be allowed to pass therethrough.

Here, in the low pass filter, the natural frequency of the vehicle suspension pitch motion is required to be set to be the same as or lower than the natural frequency of the filter. In the high pass filter, the natural frequency of the vehicle suspension pitch motion is required to be set to be the same as or higher than the natural frequency of the filter. In addition, in the band pass filter, the natural frequency of the vehicle suspension pitch motion is required to be set to be within the pass band.

Furthermore, when the transfer function model is used, the function of the corresponding transfer function is required to allow a specific frequency component to pass therethrough (or extract or enhance the specific frequency component). Here, the frequency band allowing the specific frequency component to pass therethrough (or extracting or enhancing the specific frequency component) is required to include the natural frequency of the vehicle suspension pitch motion.

Furthermore, although the filter determining and outputting the distribution ratio correction value may be configured using a single filter or a single transfer function model as described above, or the filter determining and outputting the distribution ratio correction value may be configured using a plurality of filters or a plurality of transfer function models.

When the plurality of filters or the plurality of transfer function models are used, the plurality of filters or the plurality of transfer function models may be connected in parallel, allowing a plurality of distribution ratio correction values obtained through the filters or the transfer function models, respectively, to be used simultaneously in the correction process.

Here, a predetermined gain is applied to each of the distribution ratio correction values obtained in parallel. Afterwards, the distribution ratio correction values to which the gains are applied, respectively, may be summed, producing a final distribution ratio correction value.

Furthermore, a component corresponding to the natural frequency may be enhanced using a multidimensional filter, in addition to the high pass filter or the band pass filter. Furthermore, the filter may be designed using the transfer function itself constructed by modeling real-time vertical load due to the above-described suspension pitch motion or the longitudinal load movement of the vehicle.

For example, it will be assumed that a transfer function TF for deriving a pitch angle (or squat angle) $\varphi$ in torque is constructed as in the following Equation 1. In Equation 1, "Tq" indicating torque may be a target torque command.

$$TF = \frac{\varphi}{T_q} = \frac{1}{c_1 s^2 + c_2 s + c_3} \quad \text{[Equation 1]}$$

In the instant case, a filter based on the transfer function TF may be designed and configured as in the following Equation 2. This may be applied to the target torque command or sum torque by the controller 20 to be used in determining the distribution ratio correction value.

$$c_4 s TF + c_5 TF =$$
$$\frac{c_4 s}{c_1 s^2 + c_2 s + c_3} + \frac{c_5}{c_1 s^2 + c_2 s + c_3} = \frac{c_4 s + c_5}{c_1 s^2 + c_2 s + c_3} \quad \text{[Equation 2]}$$

In Equation 2, $c_1$, $c_2$, $c_3$, $c_4$, $c_5$, and the like are coefficients (independent of being positive or negative), and s is a Laplace operator.

As described above, the distribution ratio correction value determined and output by the filter including torque (i.e., the target torque command or sum torque), applied to the drive system by all drive devices of the vehicle, as an input may be used in correcting the front and rear wheel distribution ratios. Furthermore, as described above, the filter may be replaced with the transfer function model.

Hereinafter, a method of distributing driving force to front and rear wheels according to an exemplary embodiment of the present disclosure will be described in comparison with a conventional driving force distribution method.

Figure 6:
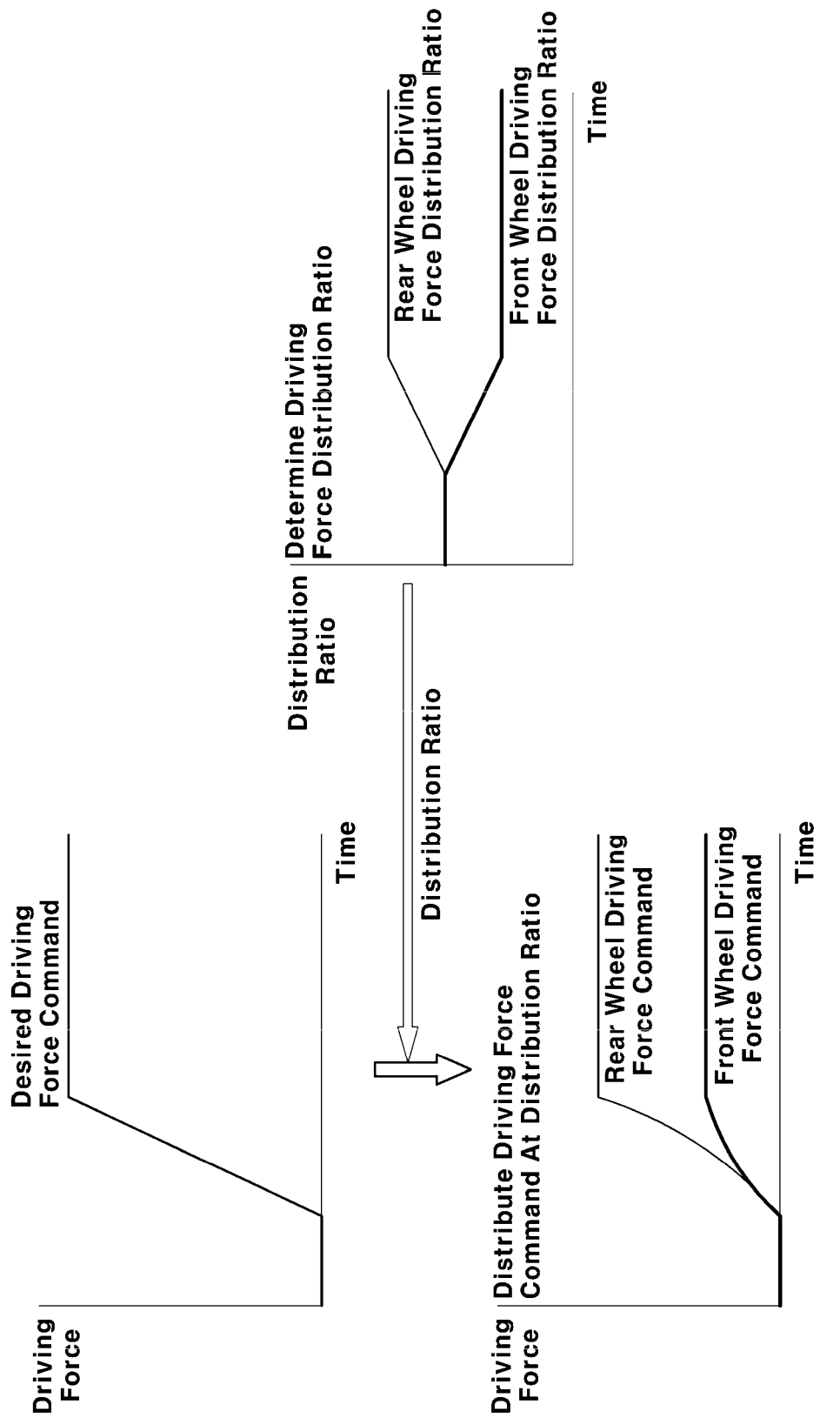
FIG. 6 is a diagram illustrating a conventional torque distribution method.
Figure 7:
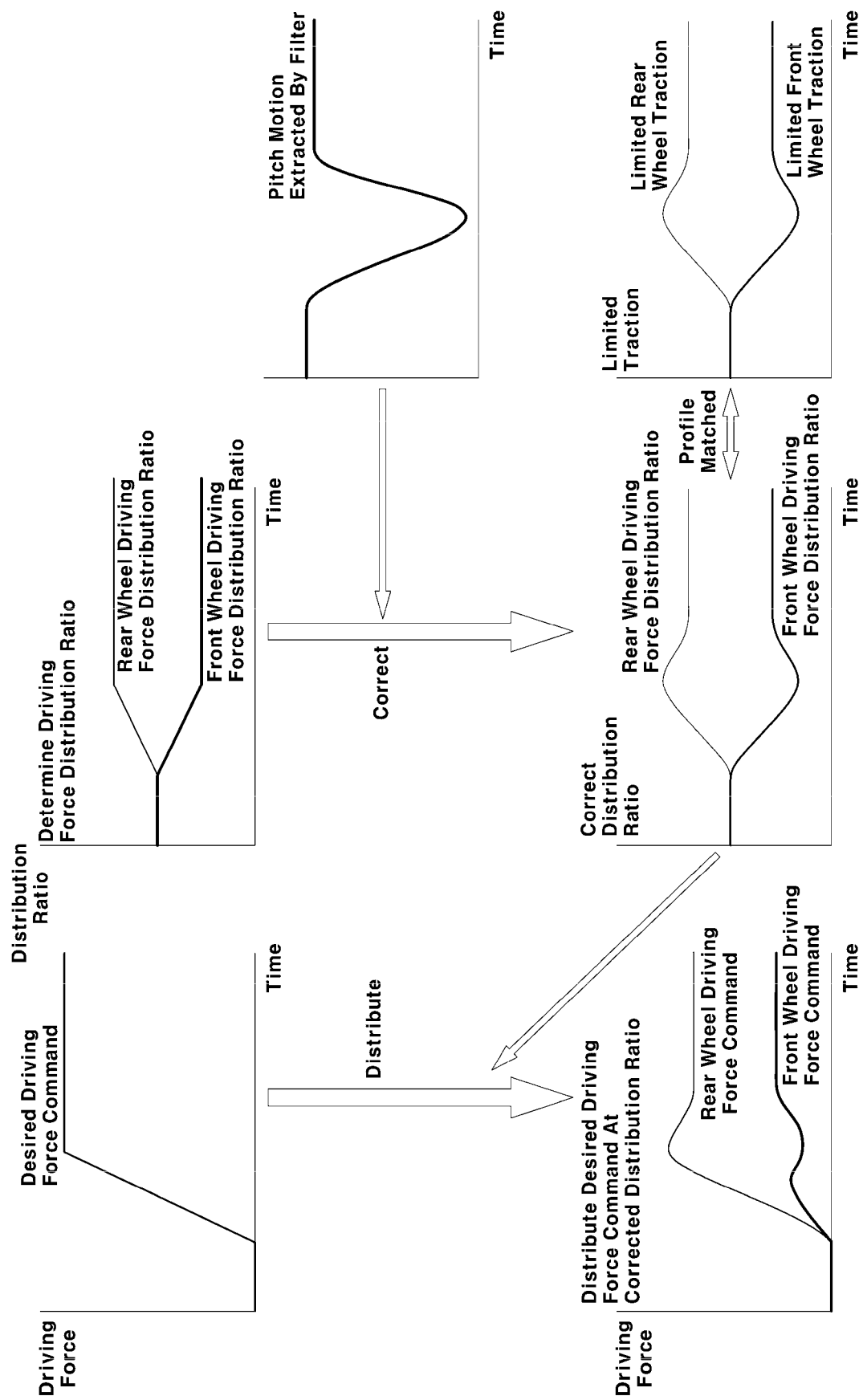
FIG. 7 is a diagram illustrating a torque distribution method according to an exemplary embodiment of the present disclosure.

FIG. 6 is a diagram illustrating a conventional torque distribution method, and FIG. 7 is a diagram illustrating a torque distribution method according to an exemplary embodiment of the present disclosure.

Generally, for torque distribution to the front and rear wheels, the torque distribution ratio (or driving force distribution ratio) is determined using a preset map or lookup table. The front wheel driving force command and the rear wheel driving force command are determined and generated by applying the determined distribution ratio to the target torque command (or sum torque).

The map (or lookup table) for determining the distribution ratio may be implemented as a map including a variable indicating the vehicle driving state as an input thereof and a distribution ratio value as an output.

Here, the variable indicating the vehicle driving state may be desired torque (or desired driving force) determined from the real-time vehicle driving information, a drive system speed of the real-time vehicle driving information, or the like. The drive system speed may be a wheel speed or the like.

As set data previously input to and stored in the controller to be used in determining the distribution ratio, a preset map or lookup table in which the correlation between variables indicating the vehicle driving state and distribution ratios is defined may be used in the related art.

Referring to FIG. 6, it may be seen that, when the front wheel driving force distribution ratio and the rear wheel driving force distribution ratio are determined as the driving force distribution ratio, the front wheel driving force command and the rear wheel driving force command is determined by applying the front wheel driving force distribution ratio and the rear wheel driving force distribution ratio to the target driving force command. For example, when the front wheel driving force distribution ratio is determined to be "a" based on the map, the rear wheel driving force distribution ratio may be determined to be "1−α."

Furthermore, in the present disclosure, real-time correction is performed to the known torque (driving force) distribution ratio, i.e., the torque front and rear wheel distribution ratios determined by the same method as the conventional method. That is, in the present disclosure, the conventional front wheel torque distribution ratio and the conventional rear wheel torque distribution ratio determined by the map or lookup table according to the vehicle driving state are further corrected. Torque is distributed to the front and rear wheels is performed according to the corrected torque distribution ratio.

The correction method includes: determining a distribution ratio correction value from a target torque command or sum torque using the natural frequency extraction or enhancement filter as described above; and correcting the distribution ratio determined by the map or lookup table by use of the determined distribution ratio correction value.

Here, an output of the filter for correcting the distribution ratio, i.e., a distribution ratio correction value, is multiplied by a predetermined scale gain, and a product of the multiplication is determined to be the final distribution ratio correction value. The determined final distribution ratio correction value is added to and subtracted from the front wheel torque distribution ratio and the rear wheel torque distribution ratio.

For example, in FIG. 1, when a state indicating a positive (+) suspension pitch angle is defined as the squatting position of the vehicle during a state in which the vehicle squats in acceleration is defined as a negative (−) pitch motion according to the notation of the International Organization for Standardization (ISO), the correction is performed by adding a correction value extracted by the filter during acceleration of the vehicle, i.e., the final distribution ratio correction value (negative) corresponding to the natural frequency component (negative) of the vehicle suspension pitch motion, to the front wheel driving force distribution ratio (or drive torque distribution ratio) to reduce the front wheel driving force distribution ratio.

In contrast, in acceleration of the vehicle, the correction is performed by subtracting the final distribution ratio correction value (negative) corresponding to the natural frequency component (negative) of the vehicle suspension pitch motion from the rear wheel driving force distribution ratio (or drive torque distribution ratio) to increase the rear wheel driving force distribution ratio.

In deceleration of the vehicle, the driving force distribution ratio (or torque distribution ratio) is corrected in a manner opposite to that of acceleration.

Referring to FIG. 7, a target driving force command and an uncorrected driving force distribution ratio are illustrated. In FIG. 7, the uncorrected driving force distribution ratio is a typical front wheel driving force distribution ratio and a typical rear wheel driving force distribution ratio determined by the conventional method. As described above with reference to FIG. 6, the uncorrected driving force distribution ratio may be determined based on the map or the lookup table from real-time variable information indicating the vehicle driving state.

Furthermore, in FIG. 7, the natural frequency component of the vehicle suspension pitch motion provided as an output of the filter for correcting the distribution ratio is illustrated. The filter for correcting the distribution ratio has the real-time target torque command (or target driving force command) as an input as described above, and extracts and outputs the natural frequency component of the vehicle suspension pitch motion from the input target torque command.

As described above, the output of the filter including the real-time target torque command as an input is the distribution ratio correction value. The controller 20 determines and generates the final distribution ratio correction value by multiplying the distribution ratio correction value provided as an output of the filter by a predetermined gain.

Furthermore, the controller 20 corrects the front wheel driving force (torque) distribution ratio and the rear wheel driving force (torque) distribution ratio, i.e., the uncorrected driving force (torque) distribution ratio, using the determined final distribution ratio correction value. That is, the final front wheel driving force distribution ratio and the final rear wheel driving force distribution ratio are determined by correcting each of the uncorrected front wheel driving force distribution ratio and the uncorrected rear wheel driving force distribution ratio by the final distribution ratio correction value.

Here, the correction may be performed by subtracting the final distribution ratio correction value from each of the uncorrected front wheel driving force distribution ratio and the uncorrected rear wheel driving force distribution ratio. For example, when the squatting position of the vehicle in acceleration is defined as a negative (−) pitch motion according to the notation of the ISO, the correction may be performed by adding the determined final distribution ratio correction value to the uncorrected front wheel driving force distribution ratio and subtracting the final distribution ratio correction value from the uncorrected rear wheel driving force distribution ratio.

Referring to FIG. 7, the negative (−) pitch motion of the vehicle in when the squatting position in acceleration is illustrated. Here, the final distribution ratio correction value may be determined to be a negative (−) value. It may be seen that, when the distribution ratio correction value determined to be a negative (−) value is added to the uncorrected front wheel driving force distribution ratio in real time, the corrected front wheel driving force distribution ratio, to which the distribution ratio correction value is added, is lower than the uncorrected front wheel driving force distribution ratio.

Furthermore, referring to FIG. 7, it may be seen that, when the distribution ratio correction value determined to be a negative (−) value is subtracted from the uncorrected rear wheel driving force distribution ratio in real time, the corrected rear wheel driving force distribution ratio, from which the distribution ratio correction value is subtracted, is greater than the uncorrected rear wheel driving force.

Furthermore, referring to FIG. 7, limitations in traction during the same time are illustrated. As illustrated in FIG. 7, the front wheel driving force distribution ratio and the rear wheel driving force distribution ratio corrected by applying the distribution ratio correction value to the uncorrected front and rear wheel driving force distribution ratios have profiles and patterns of change similar to limitations in the front wheel traction and limitations in the rear wheel traction.

As described above, the profile of the uncorrected driving force distribution ratio does not match the profile of the limit of traction occurring due to the vehicle pitch motion. In contrast, by the distribution ratio correction according to an exemplary embodiment of the present disclosure, the front and rear wheel driving force distribution ratios may be corrected to match the profiles of the front and rear wheel limits occurring due to the vehicle pitch motion.

As a result, after the correction performed as above, the controller 20 distributes the target driving force command as the front wheel driving force command and the rear wheel driving force command according to the driving force distribution ratio, i.e., the corrected front wheel driving force distribution ratio and the corrected rear wheel driving force distribution ratio (step S5 in FIG. 5).

Furthermore, the controller 20 is configured to control the operation of the front wheel drive device 31 according to the distributed front driving force command and the rear wheel drive device 32 according to the distributed rear wheel driving force command so that target driving force may be applied to the front and rear wheels (step S6 in FIG. 3).

In the present disclosure, only the driving force distribution ratio is corrected, but the driver's driving input or the target driving force command (or target torque command) corresponding to the driving mode is not changed. Thus, a sum of the front wheel driving force command and the rear wheel driving force command distributed at the driving force distribution ratio after the correction will be substantially the same as the value of the target driving force command.

Furthermore, according to an exemplary embodiment of the present disclosure, the controller 20 may shift the natural frequency, to be extracted (or enhanced) by the filter, based on information of the weight of the vehicle in real time or selectively at a predetermined period.

Typically, the natural frequency of the vehicle suspension pitch motion is not changed unless the structure or setting of the suspension of the vehicle is changed. However, the natural frequency of the vehicle suspension pitch motion may be changed in response to changes in the weight of the vehicle.

For example, when the weight of the vehicle changes by 10% or more of the total weight of the vehicle, the natural frequency is changed, and thus the filter modeled based on information regarding the previously-constructed transfer function may not be effective. Therefore, the value of the natural frequency allowed to pass through the filter may be shifted by a change in the weight of the vehicle.

In the present disclosure, the controller 20 may estimate the vehicle weight information based on real-time information collected using the sensor in the vehicle. For example, to obtain the vehicle weight information, a method of estimating a vehicle weight disclosed in Korean Patent Application Publication No. 10-2021-0068873 (Jun. 10, 2021) filed by the present applicant may be used.

According to Korean Patent Application Publication No. 10-2021-0068873 (United States Patent Application Publication No. 2021/0163018), noise may be removed from an acceleration signal input from an acceleration sensor in a vehicle by filtering the acceleration signal when the vehicle stops, a periodic value of the acceleration signal may be determined from the acceleration signal from which the noise is removed, and then a vehicle weight may be estimated in real time using information regarding the determined periodic value.

The natural frequency to be extracted by the filter may be shifted by the change in the weight of the vehicle as described above. Shifting the natural frequency may be performed by changing the configuration of the filter, for example, changing each value of the coefficients $c_1$, $c_2$, $c_3$, $c_4$, and $c_5$ in Equation 2 (or the Laplace operator in the filter) according to a shifting value.

Furthermore, according to an exemplary embodiment of the present disclosure, the distribution ratio correction process may be selectively applied to the front wheel torque distribution ratio or the rear wheel torque distribution ratio. That is, only the front wheel torque distribution ratio may be corrected by applying the distribution ratio correction value to the front wheel torque distribution ratio, and the front wheel torque command may be determined from the target torque command according to the corrected front wheel torque distribution ratio. Here, the rear wheel torque command may be determined by distributing the target torque command at the uncorrected rear wheel torque distribution ratio.

Likewise, only the rear wheel torque distribution ratio may be corrected by applying the distribution ratio correction value to the rear wheel torque distribution ratio, and the rear wheel torque command may be determined from the target torque command at the corrected rear wheel torque distribution ratio. Here, the front wheel torque command be determined by distributing the target torque command at the uncorrected front wheel torque distribution ratio.

Such an operation of selectively correcting only one of the front wheel torque distribution ratio and the rear wheel torque distribution ratio may be performed according to the purpose of the correction. When the purpose is to reduce slip while obtaining maximum acceleration/deceleration performance, both the front wheel torque distribution ratio and the rear wheel torque distribution ratio may be corrected.

However, when the purpose is to obtain ride comfort rather than obtaining performance, the effect of reducing the vehicle suspension pitch motion may be more important than to obtain maximum traction. In the instant case, in acceleration of the vehicle, the correction of the torque distribution ratio may only be applied to the front wheel torque distribution ratio by determining only correction conditions for the front wheel torque distribution ratio are met. Here, because the rear wheel torque distribution ratio is not corrected, additional acceleration may not be obtained. However, because natural frequency extraction component extraction is not performed for the rear wheels, the effect of reducing the suspension pitch motion may be further increased.

Furthermore, in deceleration of the vehicle, the correction of the torque distribution ratio may only be applied to the rear wheel torque distribution ratio by determining only correction conditions for the rear wheel torque distribution ratio are met. Here, because the front wheel torque distribution ratio is not corrected, additional braking force may not be obtained. However, because natural frequency extraction component extraction is not performed for the front wheels, the effect of reducing the suspension pitch motion may be further increased.

Furthermore, the correction may be performed according to the driving mode of the vehicle. For example, when the driving mode of the vehicle is a sports mode, the correction process may be set to determine that all of correction conditions for the front and rear wheel torque distribution ratio are met and correct both the front wheel torque distribution ratio and the rear wheel torque distribution ratio. When the driving mode of the vehicle is a comfort mode, the correction process may be set to determine that only the correction conditions for the front wheel torque distribution ratio are met and only correct the front wheel torque distribution ratio.

Furthermore, the controller 20 may be set to selectively perform the distribution ratio correction according to the variable information indicating the current vehicle driving state. That is, the controller 20 may be set to determine whether or not predetermined correction conditions are met based on information collected by the vehicle (step S3 in FIG. 3), and when the correction conditions are determined to be met, correct the distribution ratio (step S4 in FIG. 4).

In an exemplary embodiment in which the distribution ratio is selectively corrected, the controller 20 may use a state variable map, and an input variable of the state variable map may be variable information indicating the vehicle driving state, i.e., vehicle driving information. Here, the state variable map may be a map in which a driving area in which the distribution ratio correction is performed and a driving area in which the distribution ratio correction is not performed are divided according to the vehicle driving information (or vehicle driving state variable).

Furthermore, the controller 20 may perform the distribution ratio correction for one of the front wheel distribution ratio and the rear wheel distribution ratio using the state variable map including the vehicle driving information as an input. That is, the controller 20 may correct the front wheel torque distribution ratio, the rear wheel torque distribution ratio, both the front wheel torque distribution ratio and the rear wheel torque distribution ratio, or none of the front wheel torque distribution ratio and the rear wheel torque distribution ratio according to the vehicle driving information based on the state variable map.

In this regard, the state variable map may be configured so that the driving area meeting the correction conditions for the front and rear wheel torque distribution ratios and the driving area not meeting the correction conditions are divided according to the vehicle driving information (or vehicle driving state variable). That is, the state variable map in which the driving area in which the correction is performed to the front wheel torque distribution ratio and the rear wheel torque distribution ratio and the driving area in which the correction is not performed are set.

After the state variable map is previously input to and stored in the controller 20, the controller may be configured to determine whether or not an area meets the distribution ratio correction conditions based on the real-time vehicle driving information. When the area is determined to be an area in which one of the front wheel torque distribution ratio and the rear wheel torque distribution ratio is corrected, the controller may correct one of the front wheel torque distribution ratio and the rear wheel torque distribution ratio by applying the distribution ratio correction value to either thereof. After the correction, the controller may be configured to determine the final front wheel torque command or the rear wheel torque command from the target torque command using the distribution ratio.

The vehicle driving information provided as an input to the state variable map may include at least one of driver's driving input values, such as an accelerator pedal input value and a brake pedal input value, together with a vehicle speed, a drive system speed, and torque. Here, torque may be the target torque command.

Figure 8:
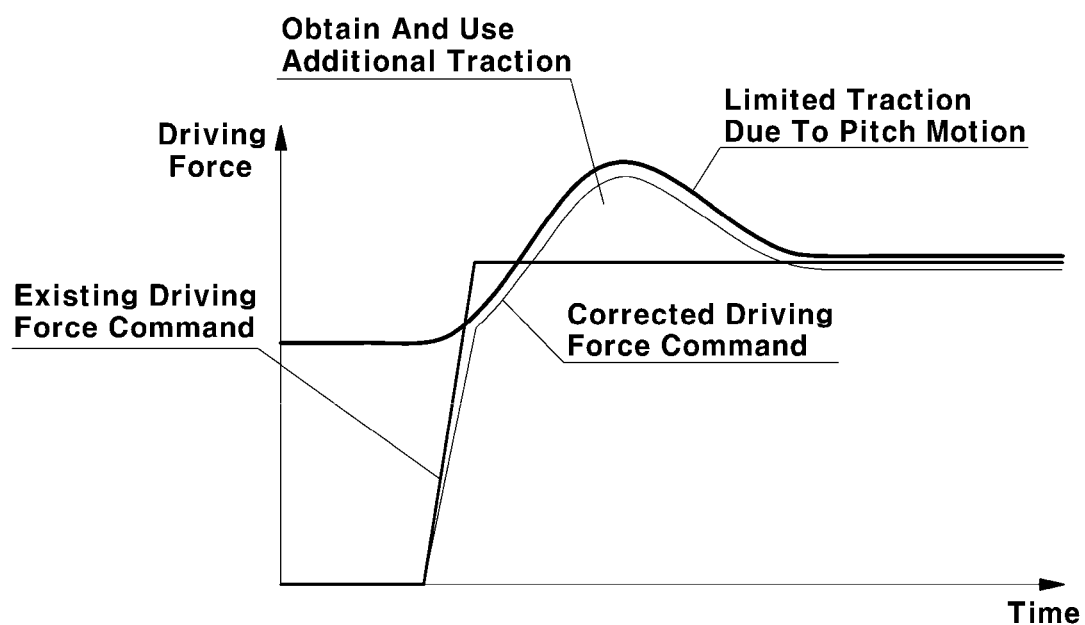
FIG. 8 is a diagram illustrating an effect of the torque distribution method according to an exemplary embodiment of the present disclosure.

FIG. 8 is a diagram illustrating an effect of the torque distribution method according to an exemplary embodiment of the present disclosure. As illustrated in FIG. 8, in consideration of the natural frequency characteristics of the vehicle suspension pitch motion, when the driving force distribution ratio is corrected using the filter for enhancing the corresponding natural frequency component in the target driving force command and the driving force is controlled in response to the driving force command after the correction, it is possible to improve acceleration performance within the range in which no wheel slip occurs, in consideration of real-time vertical load.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the scope of the present disclosure includes software or machine-executable commands (e.g., an operating system, an application, firmware, a program, etc.) for facilitating operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A torque distribution method for a vehicle, the method comprising:
    determining a natural frequency of a vehicle suspension pitch motion according to characteristics of a suspension of the vehicle;
    providing a filter or a transfer function model for extracting or enhancing a natural frequency component of the vehicle suspension pitch motion to a controller of the vehicle;
    determining, by the controller, a distribution ratio correction value using an output of a process of the filter or the transfer function model including an input of a total torque applied by a drive device to a drive system;
    correcting, by the controller, at least one of a front wheel torque distribution ratio and a rear wheel torque distribution ratio based on the determined distribution ratio correction value; and
    distributing, by the controller, a target torque command to a front wheel torque command and a rear wheel torque command based on the corrected torque distribution ratio while driving of the vehicle.

2. The torque distribution method of claim 1, further including:
    constructing a transfer function model to determine and output state information of the vehicle suspension pitch motion by receiving a variable indicating a vehicle driving state,
    wherein the natural frequency of the vehicle suspension pitch motion is determined to be a natural frequency of the constructed transfer function.

3. The torque distribution method of claim 2,
    wherein the suspension includes a front wheel suspension and a rear wheel suspension, and
    wherein the state information of the vehicle suspension pitch motion is a tire vertical load or a suspension pitch angle indicating a longitudinal inclination of the vehicle caused by expansion or compression of the front wheel suspension and the rear wheel suspension in the vehicle driving state.

4. The torque distribution method of claim 1, wherein the filter is selected from a low pass filter and a high pass filter each including a cut-off frequency corresponding to the natural frequency of the vehicle suspension pitch motion and a band pass filter including a center frequency corresponding to the natural frequency of the vehicle suspension pitch motion.

5. The torque distribution method of claim 4,
wherein the low pass filter is set so that the natural frequency of the vehicle suspension pitch motion is equal to or lower than a natural frequency of the low pass filter,
wherein the high pass filter is set so that the natural frequency of the vehicle suspension pitch motion is equal to or greater than a natural frequency of the high pass filter, and
wherein the band pass filter is set so that the natural frequency of the vehicle suspension pitch motion is present in a pass band of the band pass filter.

6. The torque distribution method of claim 1,
wherein the filter or the transfer function model is configured so that a plurality of filters or a plurality of transfer function models for extracting or enhancing the natural frequency component of the vehicle suspension pitch motion are connected in parallel, and
wherein in the determination of the distribution ratio correction value, the controller is configured to determine a sum to be the distribution ratio correction value for correcting at least one of the front wheel torque distribution ratio and the rear wheel torque distribution ratio, the sum being obtained by applying predetermined gains to the distribution ratio correction values output from the filters or the transfer function models connected in parallel and summing the gain-applied distribution ratio correction values.

7. The torque distribution method of claim 1, further including:
estimating, by the controller, a weight of the vehicle based on information collected by a sensor of the vehicle; and
changing, by the controller, the filter or the transfer function model so that the natural frequency extractable or enhanceable by the filter or the transfer function model is shifted by a change of the estimated weight of the vehicle.

8. The torque distribution method of claim 1, wherein in the correcting of the at least one of the front wheel torque distribution ratio and the rear wheel torque distribution ratio, the controller is configured to determine whether predetermined correction conditions are met based on vehicle driving information obtained while driving of the vehicle, and when the predetermined correction conditions are met, correct at least one torque distribution ratio of the front wheel torque distribution ratio and the rear wheel torque distribution ratio.

9. The torque distribution method of claim 8, wherein,
when the predetermined correction conditions are met for one of the front wheel torque distribution ratio and the rear wheel torque distribution ratio, the controller is configured to correct one torque distribution ratio of the front wheel torque distribution ratio and the rear wheel torque distribution ratio meeting the predetermined correction conditions based on the distribution ratio correction value,
for a front wheel or a rear wheel meeting the correction conditions, the controller is configured to distribute a torque command from the target torque command at the corrected torque distribution ratio, and
for the front wheel or the rear wheel not meeting the correction conditions, the controller is configured to distribute a torque command from the target torque command at an uncorrected torque distribution ratio.

10. The torque distribution method of claim 8,
wherein the controller includes a state variable map including the vehicle driving information as an input thereof and determines whether the predetermined correction conditions are met using the state variable map, and
wherein the state variable map is a map in which a driving area meeting the predetermined correction conditions for the front wheel torque distribution ratio and the rear wheel torque distribution ratio and a driving area not meeting the predetermined correction conditions for the front wheel torque distribution ratio and the rear wheel torque distribution ratio are divided according to the vehicle driving information.

11. The torque distribution method of claim 8, wherein the vehicle driving information includes at least one of an accelerator pedal input value, a brake pedal input value, vehicle speed, drive system speed, and the target torque command, the accelerator pedal input value and the brake pedal input value being driver's driving input values.

12. The torque distribution method of claim 8, wherein,
in acceleration of the vehicle, the controller is configured to determine that the predetermined correction conditions for the front wheel torque distribution ratio are met and to correct the front wheel torque distribution ratio based on the distribution ratio correction value, and
in deceleration of the vehicle, the controller is configured to determine that the predetermined correction conditions for the rear wheel torque distribution ratio are met and to correct the rear wheel torque distribution ratio based on the distribution ratio correction value.

13. The torque distribution method of claim 8, wherein, when a driving mode of the vehicle is a sports mode, the controller is configured to determine the predetermined correction conditions for the front wheel torque distribution ratio and the rear wheel torque distribution ratio are met and to correct the front wheel torque distribution ratio and the rear wheel torque distribution ratio based on the distribution ratio correction value.

14. The torque distribution method of claim 8, wherein, when a driving mode of the vehicle is a comfort mode, in acceleration of the vehicle, the controller is configured to determine that the predetermined correction conditions for the front wheel torque distribution ratio are met and to correct the front wheel torque distribution ratio based on the distribution ratio correction value.

15. The torque distribution method of claim 1,
wherein the drive device includes a front wheel drive device and a rear wheel drive device, and
wherein the method further includes controlling, by the controller, an operation of the front wheel drive device and an operation of the rear wheel drive device based on the distributed front wheel torque command and the distributed rear wheel torque command, respectively.

16. The torque distribution method of claim 1, wherein the total torque applied to the drive system from the drive device includes one selected from among:
the target torque command determined based on vehicle driving information obtained while driving of the vehicle;
an estimated value of the total torque applied to the drive system from the drive device;
sum torque obtained by summing device-specific estimated torque values applied to the drive system from a plurality of drive devices mounted on the vehicle; and sum torque obtained by summing device-specific detected torque values actually applied to the drive system from the plurality of drive devices mounted on the vehicle.

17. The torque distribution method of claim 1, wherein the controller is configured to:
   determine a value obtained by multiplying the distribution ratio correction value determined as an output from the filter or the transfer function model by a predetermined scale gain to be a final distribution ratio correction value; and
   correct the torque distribution ratio by adding the determined final distribution ratio correction value to or subtracting the final distribution ratio correction value from the at least one of the front wheel torque distribution ratio and the rear wheel torque distribution ratio.

18. The torque distribution method of claim 17, wherein, when correcting the torque distribution ratio by adding or subtracting the determined final distribution ratio correction value,
   in acceleration of the vehicle, the controller is configured to correct the rear wheel torque distribution ratio to be increased and the front wheel torque distribution ratio to be reduced, and
   in deceleration of the vehicle, the controller is configured to correct the rear wheel torque distribution ratio to be reduced and the front wheel torque distribution ratio to be increased.

19. A non-transitory computer readable storage medium on which a program for performing the method of claim 1 is recorded.

20. A torque distribution apparatus for a vehicle, the apparatus comprising:
   a drive device connected to drive wheels of the vehicle and configured to generate torque for driving wheels of the vehicle;
   a sensor configured for detecting vehicle driving information;
   a controller connected to the sensor and the drive device and configured for:
      determining a natural frequency of a vehicle suspension pitch motion according to characteristics of a suspension of the vehicle;
      determining a distribution ratio correction value using an output of a process of a filter or a transfer function model including an input of a total torque applied by the drive device to a drive system, wherein the filter or the transfer function model is configured for extracting or enhancing a natural frequency component of the vehicle suspension pitch motion;
      correcting at least one of a front wheel torque distribution ratio and a rear wheel torque distribution ratio based on the determined distribution ratio correction value; and
      distributing a target torque command to a front wheel torque command and a rear wheel torque command based on the corrected torque distribution ratio while driving of the vehicle;
      controlling operation of the drive device according to the distributed front driving force command and the distributed rear wheel driving force command so that a target driving force is applied to the wheels; and
   a non-transitory storage medium configured for storing an algorithm for an operation of the controller,
   wherein in the correcting of the at least one of the front wheel torque distribution ratio and the rear wheel torque distribution ratio, the controller is configured to determine whether predetermined correction conditions are met based on the vehicle driving information obtained while driving of the vehicle, and when the predetermined correction conditions are met, correct the at least one torque distribution ratio of the front wheel torque distribution ratio and the rear wheel torque distribution ratio.

* * * * *